United States Patent [19]

Strasser et al.

[11] 4,370,930
[45] Feb. 1, 1983

[54] END CAP FOR A PROPELLANT CONTAINER

[75] Inventors: Robert A. Strasser, Livonia; Stephen W. Goch, Northville, both of Mich.

[73] Assignee: Ford Motor Company, Dearborn, Mich.

[21] Appl. No.: 220,478

[22] Filed: Dec. 29, 1980

[51] Int. Cl.³ ............................ F42B 5/20; F42B 9/18
[52] U.S. Cl. .................................... 102/530; 102/322; 102/380; 102/470; 280/741
[58] Field of Search ............... 102/331, 380, 430, 202, 102/202.5, 204, 464–472, 482, 483, 486, 487, 374, 314, 322, 530, 531; 280/736, 741

[56] References Cited

U.S. PATENT DOCUMENTS 3,656,434 4/1972 Curran .................................. 102/467
3,771,451 11/1973 Woodring ............................. 102/482

Primary Examiner—Harold J. Tudor
Attorney, Agent, or Firm—John J. Roethel; Clifford L. Sadler

[57] ABSTRACT

An end cap for a tubular container having a deep drawn flanged cup adapted to receive an igniter device for igniting the explosive contents of the container, such as the propellant for generating gas for expanding an air bag in a vehicle passenger restraint system. The cup has in its bottom wall, a centrally located aperture normally sealed by a composite laminate of plastic film and metal foil that is rupturable by the signal from the igniter device. A plastic annulus interposed between the igniter device and laminate protects the latter against frictional erosion by rubbing action of the igniter device through environmental vibrations transmitted to the propellant container.

4 Claims, 2 Drawing Figures

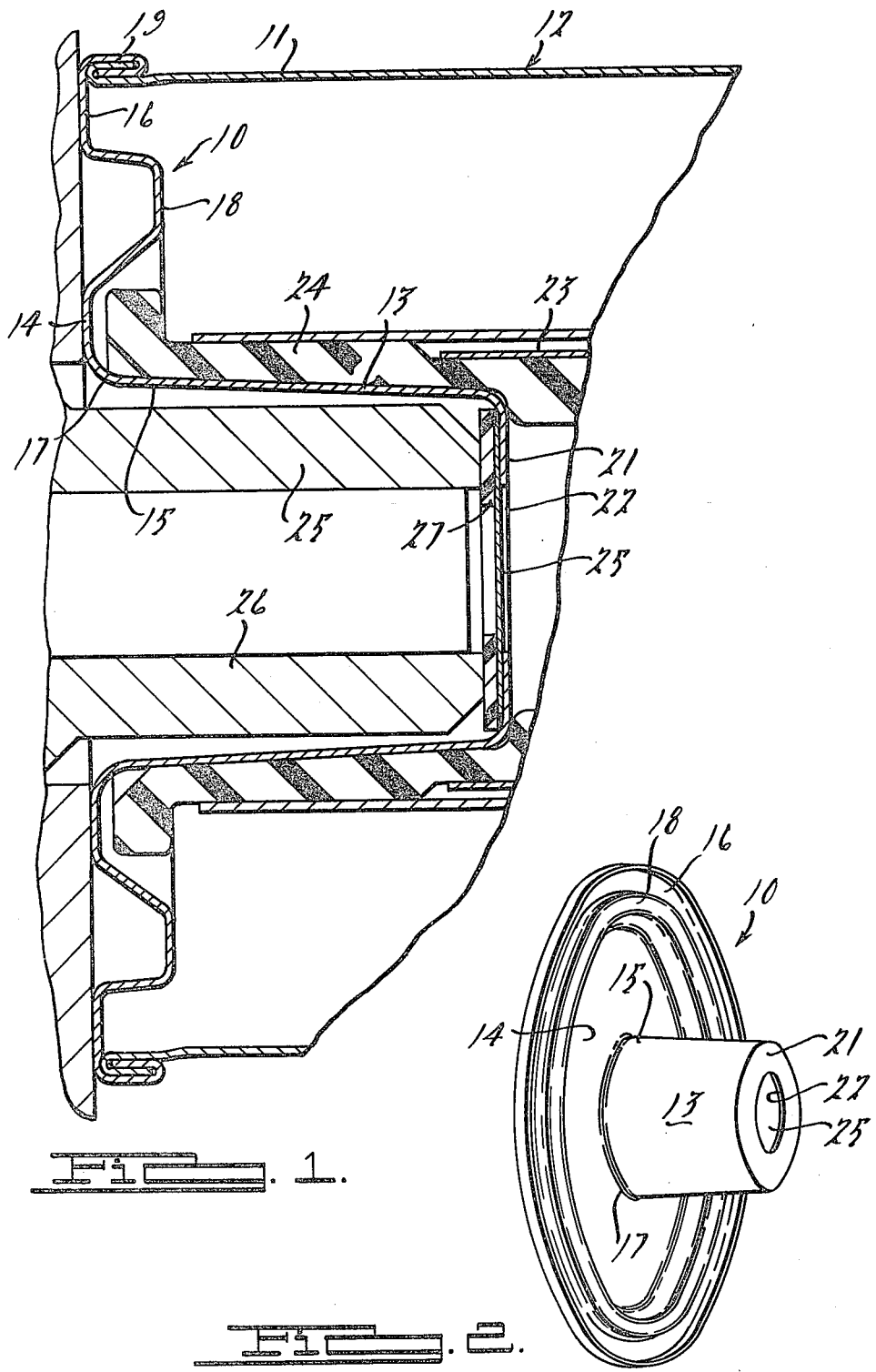

END CAP FOR A PROPELLANT CONTAINER

BACKGROUND OF THE INVENTION

In our copending application Ser. No. 220347 filed Dec. 29, 1982, there is disclosed an elongated thin wall metal cylinder having a plurality of perforations extending substantially the length thereof. The perforations are sealed by a hermetic liner to protect the contents of the container from atmospheric contamination. The container is sealed at each end by end caps. We indicated that one of the end caps had a special configuration to accommodate an igniter device since the container was particularly adapted to contain a propellant material which upon ignition would generate a gas used in vehicle air bag systems to inflate an air bag.

The present invention relates to the specifics of a preferred embodiment of the end cap having igniter device accommodation capability.

SUMMARY OF THE INVENTION

The end cap embodying the present invention is adapted to fit one end of a tubular container for a gas generating propellant such as used for inflating an air bag in a vehicle air bag passenger restraint system. The end cap comprises a deep drawn cup adapted to receive a propellant igniter device or squib. The outer width dimension or diameter of the cup is substantially less than the inner width dimension or diameter of the container. The cup has a flange engirding one of its ends. The cup is inserted into the container to a depth permitted by the flange abutting a peripheral edge of the container end. The excess material of the flange, that is, the material overlapping the container peripheral edge, is rolled and crimped over the latter for retention of the cup within the container.

The cup has at its end opposite the flanged end a base wall having a centrally located aperture through which a signal from the igniter device is passable to ignite the propellant in the container. This aperture is sealed by a composite laminate of plastic film and metal foil that is rupturable upon occurrence of the igniter device signal. A plastic annulus is interposed between the end of the igniter device and the laminate seal to protect the latter against frictional erosion by the igniter device by environmental vibrations transmitted to the propellant container.

DESCRIPTION OF THE DRAWING

Other objects, advantages and features of the present invention will become more apparent as the description proceeds, reference being had to the accompanying drawings, wherein:

FIG. 1 is an enlarged vertical section of the end cap embodying the present invention and illustrating its relationship to the propellant container of a vehicle air bag system; and FIG. 2 is a perspective view of the end cap as a separate article.

DETAILED DESCRIPTION OF THE INVENTION

Referring now to the drawing, the end cap, generally designated 10, embodying the present invention is shown mounted on the end 11 of a propellant container or cannister 12. A preferred embodiment of the container or cannister 12 is more particularly described in our aforementioned U.S. application Ser. No. 220,347 filed Dec. 29, 1980. It will be understood that before the end cap 10 is permanently affixed to the container or cannister end, some internal fittings are inserted and the container is filled with the gas generating pellets (not shown). Some of these fittings, although forming no direct part of the end cap, will be identified where necessary to understand the purpose and function of the end cap structure.

The end cap 10 of itself comprises a deep drawn cup 13 having a flange engirding its end 15. The cup outer width dimension (or diameter of a cup having a circular cross-section) is substantially less than the inner dimension (or diameter of a container having a circular cross-section). The flange 14 dimension (or diameter) prior to assembly to the container is somewhat larger than the corresponding dimension (or diameter) of the container end 11. The flange 14 is provided intermediate its outer edge 16 and it juncture 17 with the cup 13 with a cup girding depressed rib 18. In assembly of the cup flange to the upper edge 19 of the container, the excess or overhanging flange material is rolled and crimped over the container edge to interlock the two to provide a firm retention of the cup within the container.

The cup 13 has at its bottom end, the end opposite the flange 14, a base wall 21. The base wall 21 has a centrally located aperture 22 through which a signal from an igniter means or squib (not shown) can pass to ignite a quick burning initiator (not shown) in an apertured tube assembly 23 held in alignment with the cup 13 by a plastic grommet 24 which encompasses the cup, as shown in FIG. 1.

The aperture 22, in accordance with the present invention, is sealed from within the cup 13 by a composite laminate 25 of plastic film and metal foil that is readily rupturable upon occurrence of the firing of the igniter device or squib (not shown). The igniter device or squib is housed in a steel housing 26 that fits down into the cup 13. The housing 26 is a component of the inflator unit in which the container 12 is installed.

It is preferred form, the seal laminate 25 comprises a layer of aluminum foil interposed between layers of an ethylene ionomer. The seal laminate 25 is very thin. The aluminum foil is prelaminated form only has a thickness of 0.076 millimeters and the two layers of ethylene ionomer in prelaminated form are each only approximately 0.019 millimeters thick. Thus, the laminate in prelaminated form has a composite thickness of 0.114 millimeters. This thickness becomes greatly reduced in the laminating process. The laminate 25 must, however, pass a leak test in which it is subjected to helium under pressure and the leakage rate through the laminate must not exceed $1 \times 10^{-5}$ cc of helium per second.

The composite laminate seal 25 is covered by a plastic annulus 26 of nylon or other similar material. As shown in FIG. 1, the plastic annulus 27 is interposed between the end of the igniter or squib housing 26 and the seal 25. Its primary purpose is to protect the thin laminate seal 25 against frictional erosion by the igniter or squib housing 26 by environmental vibrations transmitted to the propellant container 12. The vibrations are such as occur in an inflator unit mounted in a motor vehicle as the latter traverses rough roads.

The thickness of the annulus 27 is selected to accommodate the "rose petalling" effect that occurs at the abutting end of the igniter or squib upon ignition of the same. As is known, the explosive content of the igniters or squibs is housed in a thin wall metal housing. The end of the housing is scored to provide weakened break or rupture lines so that the explosive charge is directed out the scored end with the metal peeling or curling outwardly and longitudinally from the center, thus creating the so-called "rose petal" effect. It is desirable that the thickness of the annulus 27 be such that the "rose petals" are able to contact the laminate 25 and rupture or tear the latter to permit the ignition signal to ignite the initiator which in turn ignites the gas generating pellets in the container. If the annulus is too thick, the laminate 25 will not be torn open by the "rose petal" ends, but the laminate could be blown through as a solid disk having a diameter equal to the diameter of the cup aperture 22. This disk could cover the end of the initiator and prevent ignition of the latter by the ignition signal.

It is to be understood this invention is not to be limited to the exact construction illustrated and described above, but that various changes and modifications may be made without departing from the spirit and scope of the invention as defined in the appended claims.

We claim:

1. An end cap adapted to fit on one end of a tubular container for propellant material,
   the end cap comprising a deep drawn cup adapted to receive a propellant igniter means,
   the outer width dimension of the cup being less than the inner width dimension of the container,
   the cup having a flange engirding one of its ends,
   the cup being inserted into the propellant container to a depth permitted by the flange abutting a peripheral edge of the container,
   the excess material of the flange being rolled and crimped over the container peripheral edge for retention of the cup within the container,
   the cup having at its end opposite the flanged end a base wall having a centrally located aperture through which a signal from an igniter means is passable to ignite the propellant in the container,
   the aperture normally being sealed by a composite laminate of plastic film and metal foil that is rupturable upon occurrence of the igniter means signal,
   and a plastic annulus interposed between the igniter means and the laminate to protect the latter against frictional erosion by the igniter means by environmental vibrations transmitted to the propellant container.

2. An end cap according to claim 1, in which:
   the composite laminate comprises a layer of aluminum foil interposed between layers of an ethylene ionomer.

3. An end cap according to claims 1 or 2, in which:
   the plastic annulus thickness is less than the longitudinal extent of the rose petalling effect that occurs on the end of an igniter means upon the ignition of the latter whereby the composite laminate is rupturable from its center outwardly to permit the unimpeded passage of the ignition signal into the propellant container.

4. An end cap according to claim 3, in which:
   the permeableness of the composite laminate to helium under pressure does not exceed $1 \times 10^{-5}$ cc of helium per second.

* * * * *